(12) United States Patent
Kanada et al.

(10) Patent No.: US 6,528,159 B1
(45) Date of Patent: Mar. 4, 2003

(54) SINTERED DIAMOND TOOL AND METHOD FOR MANUFACTURING THE SAME

(75) Inventors: Yasuyuki Kanada, Itami (JP); Yoshihiro Kuroda, Itami (JP); Noboru Yamazaki, Itami (JP); Yasunobu Ogata, Itami (JP); Kunihiro Tomita, Itami (JP); Tetsuo Nakai, Itami (JP); Makoto Abe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/623,276

(22) PCT Filed: Feb. 26, 1999

(86) PCT No.: PCT/JP99/00973

§ 371 (c)(1),
(2), (4) Date: Sep. 1, 2000

(87) PCT Pub. No.: WO99/44776

PCT Pub. Date: Sep. 10, 1999

(30) Foreign Application Priority Data

Mar. 2, 1998 (JP) .............................................. 10-49301
Sep. 10, 1998 (JP) ........................................... 10-256777

(51) Int. Cl.$^7$ ........................... B32B 9/00; B23B 27/20; B22F 3/24; C04B 41/87
(52) U.S. Cl. ........................... 428/336; 51/307; 51/309; 427/307; 427/309; 427/331; 428/216; 428/457; 428/408; 428/698; 428/701
(58) Field of Search ................................ 428/408, 698, 428/701, 457, 336, 216; 427/245, 307, 309, 331; 51/307, 309

(56) References Cited

U.S. PATENT DOCUMENTS

| | | | |
|---|---|---|---|
| 3,745,623 A | | 7/1973 | Wentorf, Jr. et al. |
| 4,171,973 A | | 10/1979 | Hara et al. |
| 4,224,380 A | | 9/1980 | Bovenkerk et al. |
| 4,288,248 A | | 9/1981 | Bovenkerk et al. |
| 4,636,253 A | * | 1/1987 | Nakai et al. .................. 75/239 |
| 5,037,704 A | * | 8/1991 | Nakai et al. ................. 428/698 |
| 5,178,645 A | * | 1/1993 | Nakamura et al. ............ 51/307 |
| 5,435,815 A | * | 7/1995 | Ikegaya et al. ................ 51/309 |
| 5,688,557 A | * | 11/1997 | Lemelson et al. ........... 427/249 |
| 6,302,225 B1 | * | 10/2001 | Yoshida et al. ............. 175/434 |

FOREIGN PATENT DOCUMENTS

| | | |
|---|---|---|
| JP | 52-12126 | 4/1977 |
| JP | 53-114589 | 10/1978 |
| JP | 54-114513 | 9/1979 |
| JP | 61-270285 | 11/1986 |
| JP | 03054180 | 3/1991 |
| JP | 07156003 | 6/1995 |

* cited by examiner

Primary Examiner—Archene Turner
(74) Attorney, Agent, or Firm—W. F. Fasse; W. G. Fasse (57) ABSTRACT

A diamond sintered body tool (20) having superior adhesion resistance, chipping resistance and high strength includes a tool base material (22) including a diamond sintered body, and a surface layer (21) formed on a surface of the tool base material (22). The surface layer (21) includes at least one of silicon, a silicon oxide, a silicon carbide, a silicon nitride and a solid solution thereof. The tool base material (22) has an inner portion (22b) including a first content of an iron group metal, and a surface portion (22a) surrounding the inner portion (22b) and including a second content of the iron group metal lower than the first content.

36 Claims, 1 Drawing Sheet

SINTERED DIAMOND TOOL AND METHOD FOR MANUFACTURING THE SAME

TECHNICAL FIELD

The present invention relates to diamond sintered body tools and manufacturing methods thereof. More particularly, the present invention relates to a diamond sintered body tool having superior adhesion resistance, chipping resistance and strength as well as a manufacturing method thereof.

BACKGROUND ART

Since diamond sintered bodies have superior wear resistance and strength, they are widely used as tool materials in a field that requires strength and wear resistance such as the fields of cutting tools, drilling tools and wire drawn die tools. Such diamond sintered bodies are known, for example, as the one provided by filling diamond powder in a container made of a tungsten carbide—cobalt cemented carbide and sintering it at high temperature and under high pressure as described in Japanese Patent Publication No. 52-12126. Furthermore, Japanese Patent Laying-Open No. 54-114513 describes a diamond sintered body obtained by previously mixing diamond powder and iron group metal powder and maintaining the mixed powder at high temperature and under high pressure.

These diamond sintered bodies include an iron group metal such as cobalt as a sintering aid between sintered diamond particles.

As a diamond sintered body having improved heat resistance, the one in which an iron group metal is removed from the entire diamond sintered body is described in Japanese Patent Laying-Open Nos. 53-114589 and 7-156003.

However, when a conventional diamond sintered body including an iron group metal is used as a tool, cutting of a soft metal, especially an aluminum alloy, results in adhesion of the workpiece material on the cutting edge of the tool depending on the cutting conditions and thereby deteriorates the roughness of the finished surface of the workpiece material as well as the processing precision.

In a diamond sintered body from which an iron group metal is removed, the diamond sintered body includes a gap and has smaller strength, and therefore the diamond sintered body is easily chipped.

Therefore, the present invention was made to solve the above described problems, and its object is to provide a diamond sintered body tool capable of suppressing adhesion of a soft metal such as an aluminum alloy and having superior strength and chipping resistance.

SUMMARY OF THE INVENTION

The inventors conducted a study of adhesion of a workpiece material on the surface of a diamond sintered body tool when cutting an aluminum alloy. It was found out as a result that formation of a surface layer including at least one selected from silicon, a silicon oxide, a silicon carbide, a silicon nitride and a solid solution thereof on the surface of the diamond sintered body tool is remarkably effective for preventing adhesion of a workpiece material, which led to the present invention.

In other words, on the rake face or the flank face of a tool which is engaged in cutting, the diamond sintered body as a tool base material is in contact with the aluminum alloy and, under low cutting rate or dry cutting conditions, aluminum as a workpiece material adheres even on the surface of chemically stable diamond. This would be because the bond of aluminum and diamond on the surface of the diamond sintered body is relatively strong.

In contrast, if a surface layer including at least one selected from silicon (Si), a silicon oxide ($SiO_2$), a silicon carbide (SiC), a silicon nitride ($Si_3N_4$) and a solid solution thereof is formed on the surface of the diamond sintered body tool, strongly bonded diamond and aluminum can be prevented from being in contact with each other and aluminum can be prevented from being adhered on the rake surface or the flank face of the tool because any of these surface layers are weakly bonded to aluminum.

Especially when the surface layer is formed of Si, $SiO_2$, SiC or $Si_3N_4$, the bonding force of the surface layer and aluminum is lowered further since the surface layer is chemically stable, and the effect of preventing aluminum adhesion becomes higher.

The surface layer is generally formed in the following manner. When the surface layer is made of silicon, silicon powder having a particle size of at least 1 μm and at most 20 μm, for example, is pressed against the tool surface to form a thin silicon adsorption layer on the surface. When the surface is made of a silicon oxide, a silicon carbide and/or a silicon nitride, the surface layer is formed at a temperature of 400° C. to 500° C. using an arbitrary material gas selected from $SiH_4$, $O_2$, $N_2$, $C_2H_4$ by the plasma CVD (Chemical Vapor Deposition) method, for example. Besides, the surface layer can also be formed by using similar material gases and the methods such as the vacuum deposition, sputtering and ion plating.

Thus, in order to bring about the effect of adhesion prevention, the thickness of the surface layer formed on the diamond sintered body needs to be at least 0.1 nm. when the thickness of the surface layer exceeds 1 μm, formation of the surface layer often makes the surface rougher, which, on the contrary, easily causes adhesion of a workpiece material. Therefore, the thickness of the surface layer formed on the diamond sintered body is preferably in the range from 0.1 nm to 1 μm.

When an iron group metal such as Fe, Co and Ni is used as a sintering aid in the diamond sintered body, the iron group metal tends to be a starting point of adhesion caused at the cutting edge of the tool since a good wetting property is observed between such iron group metals and aluminum. Although the "wettability" generally means easiness of contact between a solid and a liquid, it refers to easiness of close contact between a tool and a workpiece in this specification. Thus, "a bad wettability" indicates a situation when a tool and a workpiece come into contact, they do not closely contact each other. On the other hand, "a good wettability" indicates a situation when a tool and a workpiece come into contact, they tend to closely contact each other.

By previously removing an iron group metal included in the diamond sintered body from the surface and thereafter forming the surface layer, adhesion is effectively prevented even when the surface of the diamond sintered body is partially exposed by long term cutting.

In short, a diamond sintered body including an iron group metal is used to manufacture a tool, and then the tool is immersed in an acid solution to remove the iron group metal from the surface of the diamond sintered body. Then, a surface layer including at least one selected from silicon, a silicon oxide, a silicon carbide, a silicon nitride and a solid solution thereof is formed on the tool rake surface or the tool flank face of the diamond sintered body tool. Thus, adhesion resistance for long term cutting can be improved.

Similarly, a diamond sintered body including an iron group metal is immersed in an acid solution to remove the iron group metal from the surface of the diamond sintered body. Thereafter, the diamond sintered body is used to form a tool. By forming a surface layer including at least one selected from silicon, a silicon oxide, a silicon carbide, a silicon nitride and a solid solution thereof on the tool rake surface or the tool flank face of the tool, adhesion resistance for long term cutting can be improved.

Furthermore, a diamond sintered body including an iron group metal is immersed in an acid solution to remove the iron group metal from the surface of the diamond sintered body. Thereafter, a surface layer including at least one selected from silicon, a silicon oxide, a silicon carbide, a silicon nitride and a solid solution thereof is formed on the surface of the diamond sintered body. By forming a tool using it, adhesion resistance for long term cutting can be improved.

Here, the diamond sintered body in which the iron group metal is removed from the surface as described above is characterized in that it includes an inner portion including a first content of the iron group metal, and a surface portion surrounding the inner portion and including a second content of the iron group metal, the second content being lower than the first content. The sintered body structure is formed with such a changing content of the iron group metal because the cutting performance of the sintered body is to be improved when it is used as a tool.

That is, when the iron group metal is removed over the entire sintered body, the diamond sintered body includes a gap and has small strength and therefore the tool is easily chipped. In the present invention, since the iron group metal is removed only from the surface layer of the diamond sintered body, the strength of the sintered body is not lowered and the tool is not chipped. Therefore, adhesion resistance is effectively improved.

In order to obtain such an effect, the second content of the iron group metal needs to be at most 2.0% by weight. when the thickness of a sintered body surface portion having the second content is 2 nm or less, it is difficult to attain the effect of improving adhesion resistance by removing the iron group metal from the surface of the diamond sintered body. When the thickness of a sintered body surface portion having the second content exceeds 5000 nm, the cutting edge of the tool is easily chipped. Therefore, the range of thickness of the surface portion having the second content is preferably at least 2 nm and at most 5000 nm from the surface of the diamond sintered body. Particularly, in a preferred embodiment of the present invention, the particle size of diamond particles in the diamond sintered body is at least 0.1 μm and at most 60 μm, and the content of sintered diamond particles in the diamond sintered body is at least 80% and at most 96% by volume.

The inventors conducted various studies of adhesion of a workpiece material on the surface of a diamond sintered body tool when cutting an aluminum alloy. As a result, it was found out that adhesion of a workpiece material starts from an iron group metal (iron, cobalt, nickel) included in the diamond sintered body tool.

Since the iron group metal (cobalt, iron, nickel) used as a sintering catalyst in the diamond sintered body has a good wettability with respect to aluminum as a workpiece material, aluminum first comes into close contact with the iron group metal on the surface of the diamond sintered body tool. Thereafter, adhesion of aluminum spreads over the entire surface of the diamond sintered body tool as was found out.

Thus, in order to prevent adhesion, the iron group metal existing on the surface of the diamond sintered body tool is removed, and therefore the adhesion resistance of the diamond sintered body tool is substantially improved.

However, when the iron group metal is removed from the entire diamond sintered body as in conventional cases, a large number of gaps exist in the diamond sintered body, which causes the strength to be lowered and chipping to occur easily. Then, the present invention aims to prevent decrease in the strength and occurrence of chipping by removing the iron group metal only from the surface portion of the diamond sintered body tool.

A diamond sintered body tool of the present invention based on such an idea includes a tool base material including a diamond sintered body, and a surface layer including at least one material selected from the group of silicon, a silicon oxide, a silicon carbide, a silicon nitride and a solid solution thereof formed on a surface of the tool base material. The silicon oxide is preferably $SiO_2$. The silicon carbide is preferably SiC. The silicon nitride is preferably $Si_3N_4$. The thickness of the surface layer is preferably at least 0.1 nm and at most 1 μm. The diamond sintered body tool is preferably brazed to a tool original material. The tool base material has a tool rake surface and a tool flank face, and the surface layer is preferably formed on at least one of the tool rake surface and the tool flank face.

A diamond sintered body tool according to another aspect of the present invention includes a tool base material including a diamond sintered body, and a surface layer including at least one material selected from the group of silicon, a silicon oxide, a silicon carbide, a silicon nitride and a solid solution thereof formed on a surface of the tool base material. The tool base material has an inner portion including a first content of an iron group metal, and a surface portion surrounding the inner portion and including a second content of the iron group metal, the second content being lower than the first content. The silicon oxide is preferably $SiO_2$. The silicon carbide is preferably SiC. The silicon nitride is preferably $Si_3N_4$. The thickness of the surface layer is preferably at least 0.1 nm and at most 1 μm. The second content is preferably at most 2.0% by weight. A portion which is at least 2 nm and at most 5000 nm in depth from the diamond sintered body surface is preferably the surface portion. The diamond sintered body tool is preferably brazed to the tool original material. Preferably, the tool base material has a tool rake surface or a tool flank face, and the surface layer is formed on at least one of the tool rake surface and the tool flank face.

A diamond sintered body tool according to another aspect of the present invention includes an inner portion including a first content of an iron group metal, and a surface portion surrounding the inner portion and including a second content of the iron group metal, the second content being lower than the first content.

According to such a structure, the content of the iron group metal is low in the surface portion, and it becomes difficult for aluminum to be adhered on the surface portion. Since a larger amount of iron group metal exists in the inner portion than in the surface portion, occurrence of a gap in the inner portion can be suppressed. Therefore, the strength and the chipping resistance are not lowered.

The second content is preferably at most 2.0% by weight.

A portion which is at least 2 nm and at most 5000 nm in depth from the diamond sintered body tool surface is preferably the surface portion.

For a sintered body having a relatively lower diamond content in which the content of sintered diamond particles is at most 96% by volume, or for a sintered body in which the diameter of a sintered diamond particle is at most 60 μm, adhesion of aluminum is particularly easily caused. Since the minimum size of an actually producible sintered diamond particle is 0.1 μm and the diamond content in this case is 80% by volume, the effects of the present invention are particularly evident for a diamond sintered body tool in which the size of a diamond particle is at least 0.1 μm and at most 60 μm or the content of sintered diamond particles is at least 80% and at most 96% by volume.

The diamond sintered body tool is preferably brazed to a tool original material.

Furthermore, at least one of the tool rake surface and the tool flank face is preferably formed on the surface portion.

Adhesion of the above described workpiece made of an aluminum alloy is also greatly influenced by cutting conditions.

Especially in the case the cutting speed is under 200 m/min, adhesion easily occurs on the surface of the diamond sintered body tool. Therefore, for milling or drilling tools of which the cutting speed is lower, such as a reamer tool, an end mill tool, a drill tool and a boring tool, the present invention provides remarkable effects for adhesion resistance.

A method of manufacturing a diamond sintered body tool according to one aspect of the present invention includes the steps of (1) preparing a diamond sintered body, (2) processing the diamond sintered body to form a diamond sintered body tool, and (3) forming a surface layer including at least one selected from the group of silicon, a silicon oxide, a silicon carbide, a silicon nitride and a solid solution thereof on a surface of the diamond sintered body tool.

A method of manufacturing a diamond sintered body tool according to another aspect of the present invention includes the steps of (1) preparing a diamond sintered body including an iron group metal, (2) processing the diamond sintered body to form a diamond sintered body tool, and (3) surface treating the diamond sintered body tool by immersing the diamond sintered body tool in an acid solution to remove the iron group metal from a surface portion and thereby make the content of the iron group metal lower in the surface portion than in the inner portion.

The acid solution preferably includes at least one selected from the group of nitric acid, hydrochloric acid and hydrofluoric acid.

The content of iron group metal in the surface portion is preferably at most 2.0% by weight.

A method of manufacturing a diamond sintered body tool according to still another aspect of the present invention includes the steps of (1) preparing a diamond sintered body including an iron group metal, (2) surface treating the diamond sintered body by immersing the diamond sintered body in an acid solution to remove the iron group metal from a surface portion of the diamond sintered body and thereby make the content of the iron group metal lower in the surface portion than in an inner portion of the diamond sintered body, and (3) processing the surface treated diamond sintered body to obtain a diamond sintered body tool.

In these methods of manufacturing a diamond sintered body, the content of the iron group metal is made lower in the surface portion than in the inner portion, and therefore a diamond sintered body tool having superior adhesion resistance, strength and chipping resistance can be obtained.

A method of manufacturing a diamond sintered body tool according to a further aspect of the present invention includes the steps of (1) preparing a diamond sintered body including an iron group metal, (2) processing the diamond sintered body to form a diamond sintered body tool, (3) immersing the diamond sintered body tool in an acid solution to remove the iron group metal from a surface portion and thereby make the content of the iron group metal lower in the surface portion than in an inner portion, and (4) forming a surface layer including at least one selected from the group of silicon, a silicon oxide, a silicon carbide, a silicon nitride and a solid solution thereof on a tool rake surface or a tool flank face of the diamond sintered body tool.

The acid solution preferably includes at least one selected from the group of nitric acid, hydrochloric acid and hydrofluoric acid.

The content of the iron group metal in the surface portion is preferably at most 2.0% by weight.

A method of manufacturing a diamond sintered body tool according to a further aspect of the present invention includes the steps of (1) preparing a diamond sintered body including an iron group metal, (2) immersing the diamond sintered body in an acid solution to remove the iron group metal from a surface portion of the diamond sintered body and thereby make the content of the iron group metal lower in the surface portion than in an inner portion, (3) processing the surface treated diamond sintered body to obtain a diamond sintered body tool, and (4) forming a surface layer including at least one selected from the group of silicon, a silicon oxide, a silicon carbide, a silicon nitride and a solid solution thereof on a surface of the surface treated diamond sintered body tool.

The acid solution preferably includes at least one selected from the group of nitric acid, hydrochloric acid and hydrofluoric acid.

The content of the iron group metal in the surface portion is preferably 2.0% by weight.

A method of manufacturing a diamond sintered body tool according to a further aspect of the present invention includes the steps of (1) preparing a diamond sintered body including an iron group metal, (2) immersing the diamond sintered body in an acid solution to remove the iron group metal from a surface portion of the diamond sintered body and thereby make the content of the iron group metal lower in the surface portion than in an inner portion of the diamond sintered body tool, and (3) forming a surface including at least one selected from the group of silicon, a silicon oxide, a silicon carbide, a silicon nitride and a solid solution thereof on a surface of the surface treated diamond sintered body, and (4) processing the diamond sintered body on which the surface layer is formed to obtain a diamond sintered body tool.

The acid solution preferably includes at least one selected from the group of nitric acid, hydrochloric acid and hydrofluoric acid.

The content of the iron group metal in the surface portion is preferably at most 2.0% by weight.

A method of manufacturing a diamond sintered body tool according to a further aspect of the present invention includes the steps of (1) preparing a diamond sintered body, (2) forming a surface layer including at least one selected from the group of silicon, a silicon oxide, a silicon carbide, a silicon nitride and a solid solution thereof on a surface of the diamond sintered body, and (3) processing the diamond sintered body on which the surface layer is formed to form a diamond sintered body tool.

DETAILED DESCRIPTION OF BEST MODES FOR CARRYING OUT THE INVENTION

In the following, best modes for carrying out the present invention will be described with reference to the figures.

Figure 1:
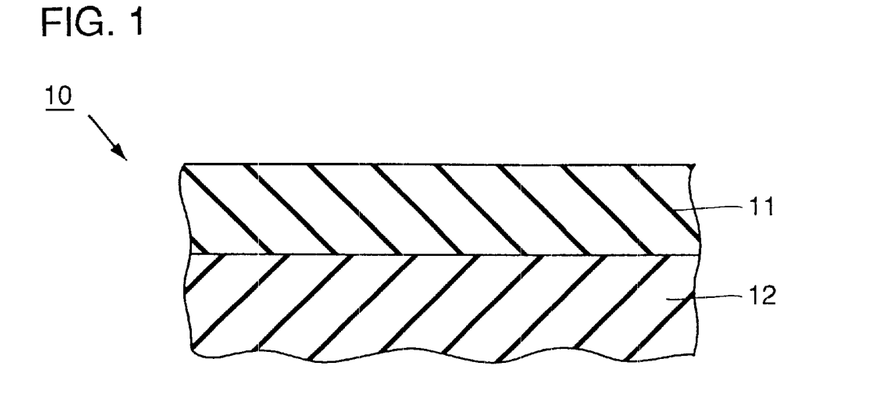
FIG. 1 is a schematic sectional view of a diamond sintered body tool according to one aspect of the present invention.

FIG. 1 is a schematic sectional view of a diamond sintered body tool according to one aspect of the present invention. Referring to FIG. 1, a diamond sintered body tool 10 includes a tool base material 12 including a diamond sintered body, and a surface layer 11 formed on a surface of tool base material 12. Surface layer 11 includes at least one selected from silicon, a silicon oxide, a silicon carbide, a silicon nitride and a solid solution thereof.

Figure 2:
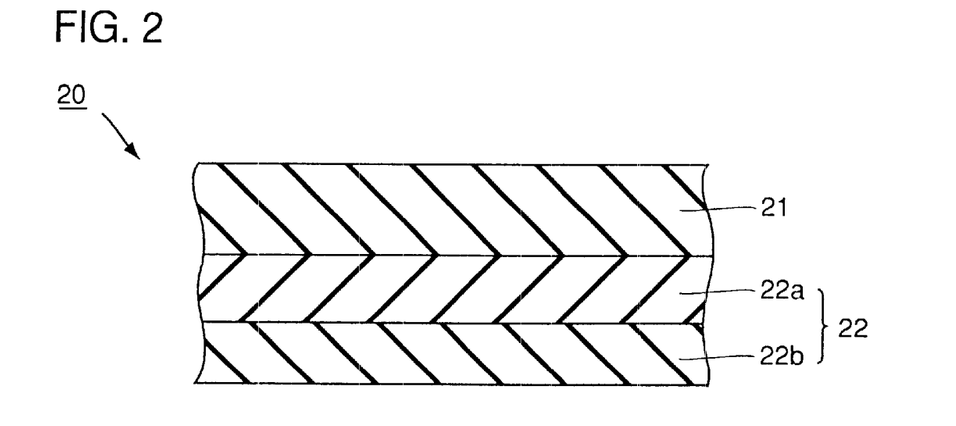
FIG. 2 is a schematic sectional view of a diamond sintered body tool according to another aspect of the present invention.

FIG. 2 is a schematic sectional view of a diamond sintered body tool according to another aspect of the present invention. Referring to FIG. 2, a diamond sintered body tool 20 includes a tool base material 22 including a diamond sintered body, and a surface layer 21 formed on a surface of tool base material 22. Surface layer 21 includes at least one selected from silicon, a silicon oxide, a silicon carbide, a silicon nitride and a solid solution thereof. Tool base material 22 has an inner portion 22b including a first content of an iron group metal, and a surface portion 22a surrounding inner portion 22b and including a second content of the iron group metal, the second content being lower than the first content.

Figure 3:
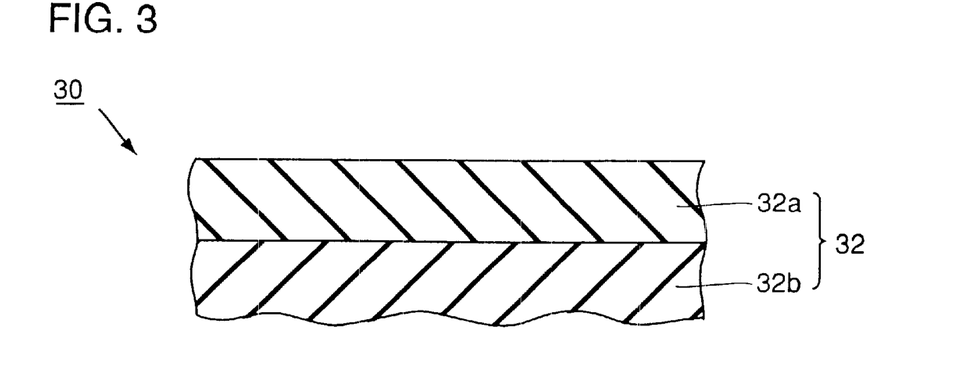
FIG. 3 is a schematic sectional view of a diamond sintered body tool according to a further aspect of the present invention.

FIG. 3 is a schematic sectional view of a diamond sintered body tool according to a further aspect of the present invention. Referring to FIG. 3, a diamond sintered body tool 30 has an inner portion 32b including a first content of an iron group metal, and a surface portion 32a surrounding inner portion 32b and including a second content of the iron group metal, the second content being lower than the first content, and includes a tool base material 32 having a diamond sintered body.

FIRST EMBODIMENT

Diamond particles having a diameter size in the range from 0.1 to 4 μm were first prepared. A sintering aid made of iron group metal (cobalt, iron and nickel) particles was also prepared. The diamond particles and the iron group metal were mixed by a ball mill so that the diamond content was 90% by volume, and the mixed powder was formed. After the mixed powder was heated in vacuum at a temperature of 800° C. for one hour, it was filled in a capsule made of a cemented carbide and maintained and sintered for one hour under the condition that the pressure was 50,000 atmospheric pressure and the temperature was 1,400° C. Thus, such a diamond sintered body was obtained that had a sintered diamond particle size of 0.1 to 4 μm and an iron group metal content of 15% by weight.

The similar process was repeated to obtain five diamond sintered bodies having the same composition. Each of these five diamond sintered bodies was processed to the shape of a reamer tool having two cutting edges.

These reamer tools were immersed in an acid solution (aqua regia) for time periods indicated in Table 1 to remove the iron group metal from surface portions of the reamer tools and thereby obtain Samples No. 1 to 5. For Samples No. 1 to 5, the depth of a portion having an iron group content of at most 2.0% by weight was examined. The results are as shown in Table 1.

TABLE 1

| | Sample No. | Time for immersion in an acid solution (min.) | Depth of a portion having an iron group metal content of at most 2.0% by weight (nm) |
| --- | --- | --- | --- |
| Comparative example | 1 | 0 | 0 |
| Comparative example | 2 | 0.5 | 1.5 |
| Example of the invention | 3 | 5 | 2.5 |
| Example of the invention | 4 | 60 | 4000 |
| Comparative example | 5 | 180 | 6000 |

Then, Samples No. 1 to 5 were used to process a workpiece under the following cutting conditions.

workpiece: an aluminum alloy (JIS A6061, T6 process material)

processed hole diameter: 15 mm cutting speed: 100 m/min feed rate: 0.1 mm/rev coolant: wet condition It was examined whether the cutting processing caused adhesion on at least one of the rake surface and the flank face of a reamer tool. The roughness ($R_{max}$) of a finished surface of the workpiece was also checked. The results are as shown in Table 2.

TABLE 2

| | Sample No. | Existence of adhesion | Roughness of a finished surface $R_{max}$ (μm) |
| --- | --- | --- | --- |
| Comparative example | 1 | with adhesion | 9.2 |
| Comparative example | 2 | with adhesion | 8.6 |
| Example of the invention | 3 | without adhesion | 1.2 |
| Example of the invention | 4 | without adhesion | 1.1 |
| Comparative example | 5 | chipped cutting edge | — |

It was found out from Table 2 that, for each of Samples No. 3 and 4, a portion including a small amount of the iron group metal had a suitable depth, and therefore the aluminum alloy was not adhered and superior roughness of a finished surface was obtained. On the contrary, for Sample No. 1 in which a large amount of the iron group metal existed on the surface, or for Sample No. 2 in which a portion having a small amount of the iron group metal was shallow, the aluminum alloy was adhered on the rake surface and the resulting deterioration of the roughness of a finished surface was observed. For Sample No. 5, a portion having a small amount of the iron group metal existed deeper, and therefore a portion having a pore became larger, the cutting edge of the tool was chipped, and found not to continue to cut.

SECOND EMBODIMENT

Diamond particles having particle sizes shown in Table 3 were first prepared. These diamond particles and an iron group metal were mixed, and heated and sintered similarly to the first embodiment to obtain diamond sintered bodies (Samples No. 11 to 18). For each sample, the diameter of a sintered diamond particle was measured. As a result, the diameter of the sintered diamond particle was equal to the diameter of the pre-sintered diamond particle. The diamond content and the iron group metal content were also measured. The results are as shown in Table 3.

TABLE 3

| Sample No. | Diameter of a diamond particle (μm) | Diamond content (% by volume) | Iron group metal content (% by weight) |
|---|---|---|---|
| 11 | 0.5 | 85 | 17 |
| 12 | 5 | 90 | 15 |
| 13 | 25 | 95 | 12 |
| 14 | 70 | 98 | 6 |
| 15 | 0.5 | 85 | 17 |
| 16 | 5 | 90 | 15 |
| 17 | 25 | 95 | 12 |
| 18 | 70 | 98 | 6 |

Then, each of Samples No. 11 to 14 was immersed in an hydrochloric acid solution of 60% by weight to remove the iron group metal from a surface portion of the diamond sintered body. For each sample, the depth of a portion having an iron group metal content of at most 2.0% by weight was measured. The results are as shown in Table 4.

TABLE 4

| Sample No. | Depth of a portion having an iron group metal content of at most 2.0% by weight (nm) |
|---|---|
| 11 | 30 |
| 12 | 30 |
| 13 | 30 |
| 14 | 30 |
| 15 | — |
| 16 | — |
| 17 | — |
| 18 | — |

Then, each of the diamond sintered bodies denoted by Samples No. 11 to 18 was processed to the shape of the cutting edge of a drill. At this time, for each of Samples No. 11 to 14, a portion which was 25 nm in depth from the rake surface and the flank face had an iron group metal content of at most 2.0% by weight. The drill cutting edges were brazed to drill tool original materials made of a cemented carbide to manufacture drill tools. The drill tools were used for drilling under the following conditions.

workpiece: an aluminum alloy (JIS ADC12, T6 process material)

drilling diameter: 5 mm cutting speed: 50 m/min feed rate: 0.08 mm/tooth coolant: wet condition After the drilling processing, it was examined whether the aluminum alloy was adhered on the cutting edge of a drill. The diameter of the processed hole was also measured. The results are as shown in Table 5.

TABLE 5

| | Sample No. | Existence of adhesion | Diameter of a processed hole (mm) |
|---|---|---|---|
| Examples of the invention | 11 | without adhesion | 5.002 |
| | 12 | without adhesion | 4.998 |
| | 13 | without adhesion | 5.001 |
| | 14 | without adhesion | 5.000 |
| Comparative examples | 15 | with significant adhesion | 5.044 |
| | 16 | with significant adhesion | 5.021 |
| | 17 | with significant adhesion | 5.015 |
| | 18 | slight adhesion | 5.006 |

It was found out from Table 5 that, for each of Samples No. 11 to 14 in which the iron group metal content of the surface portion was small, the aluminum alloy was not adhered. Since the tolerance of a processed hole, that is, the range permissible as an error is 5±0.006 mm, it can be seen that the processed holes formed in Samples No. 11 to 14 are within the tolerance.

On the contrary, for each of Samples No. 15 to 17, the iron group metal was not removed from the surface of a cutting edge, that is, a large amount of the iron group metal existed on the surface of the cutting edge, and therefore the aluminum was adhered and it was difficult to obtain a processed hole diameter within the tolerance. For Sample No. 18, the diameter of a diamond particle was large although the iron group metal existed on the surface of a cutting edge, and therefore adhesion was slight. It was therefore difficult to obtain a processed hole diameter within the tolerance. It was made clear from these results that application of the present invention is effective for preventing adhesion particularly in a sintered body in which the diameter of a sintered diamond particle is small and the diamond content is low.

THIRD EMBODIMENT

TABLE 6

| Sample No. | Composition of a surface layer | Thickness of a surface layer (nm) |
|---|---|---|
| 21 | silicone layer (framework of molecular structure: —Si—O—Si—O—) | 5 |
| 22 | Si | 5 |
| 23 | $SiO_2$ | 5 |
| 24 | SiC | 5 |
| 25 | $Si_3N_4$ | 5 |
| 26 | without any surface layer | — |

Table 6 shows examples of various diamond sintered tools prepared to examine the influences that mainly the surface composition exerts on the adhesion resistance of a diamond sintered body tool. In short, for any tools of Table 6, a diamond sintered body tool having a particle size of at least 0.1 μm and at most 4 μm was used as a tool base material. Surface layers of various compositions were formed on the rake surfaces and the flank faces of the diamond sintered body tools.

Each of the tools denoted by Samples No. 21 to 26 was first manufactured to an insert of a desired shape having a cutting edge made of a diamond sintered body.

Thereafter, for Sample No. 21, silicone grease was applied to the tool rake surface and the tool flank face of the diamond sintered body to form a silicone layer having the thickness indicated in Table 6 based on the molecular structure of a siloxane bond (—Si—O—Si—O—) shown in Table 6.

For the tool denoted by Sample No. 22, the silicon layer having the thickness indicated in Table 6 was formed by pressing silicon powder against the portions of the tool rake surface and the tool flank face of the diamond sintered body.

For the tools denoted by Samples No. 23 to 25, the surface layers having the compositions indicated in Table 6 were formed at a composing temperature of at least 400° C. and at most 500° C. by the plasma CVD method employing a gas selected from $SiH_4$, $O_2$ and $C_2H_4$, respectively.

For comparison, the tool denoted by Sample No. 26 was not processed to form a surface layer.

By performing the cutting processing using the tools under the following conditions, the adhesion resistance of each tool was evaluated.

workpiece: an aluminum alloy (JIS A6061, T6 process material)
cutting speed: 60 m/min
depth of cut: 0.3 mm
feed rate: 0.1 mm/rev
coolant: dry condition The results are shown in Table 7.

TABLE 7

| Sample No. | Existence of adhesion | Roughness of a finished surface Rmax ($\mu$m) |
| --- | --- | --- |
| 21 | without adhesion | 3.8 |
| 22 | without adhesion | 4.1 |
| 23 | without adhesion | 3.9 |
| 24 | without adhesion | 4.0 |
| 25 | without adhesion | 4.1 |
| 26 | with adhesion | 12.3 |

As a result of the above test, superior results were attained when Samples No. 21 to 25 as sintered body tools of the present invention were used for processing. It was made clear that since a surface layer having a weak bonding force with aluminum existed on the tool rake surface and the tool flank face of the diamond sintered body tool, aluminum was not adhered and superior roughness of the finished surface was obtained. On the contrary, for Sample No. 26 which is a tool not having a special surface layer, the aluminum alloy was adhered on the tool rake surface and the resulting deterioration of the roughness of the finished surface was observed.

FOURTH EMBODIMENT

TABLE 8

| Sample No. | Composition of a surface layer | Thickness of a surface layer (nm) | Roughness of a surface layer ($\mu$m) |
| --- | --- | --- | --- |
| 31 | $SiO_2$ | 5 | 0.013 |
| 32 | $SiO_2$ | 200 | 0.022 |
| 33 | $SiO_2$ | 1000 | 0.055 |
| 34 | $SiO_2$ | 1800 | 0.105 |
| 35 | without any surface layer | — | 0.010 |

Table 8 shows examples of various diamond tools prepared to examine the influences mainly the surface layer thickness exerts on the adhesion resistance of a diamond sintered body tool. In short, for the tools in Table 8, diamond sintered body tools each having a particle size of at least 4 $\mu$m and at most 10 $\mu$m were used as tool base materials. Surface layers of various thickness values were formed on the rake surfaces of the diamond sintered body tools.

For each of the tools denoted by Samples No. 31 to 34, an $SiO_2$ layer having the thickness indicated in Table 8 was formed on a lapped diamond sintered body surface by the ion plating method. Thereafter, the sintered body was brazed to a reamer shank made of a cemented carbide to manufacture a diamond sintered body reamer tool having a desired shape.

For comparison, a diamond sintered body tool not having any surface layer was used to manufacture a tool by a similar method to that for producing Samples No. 31 to 34, and thus the tool denoted by Sample No. 35 was obtained. By performing the cutting processing using these tools under the following conditions, the adhesion resistance of each tool was evaluated.

workpiece: an aluminum alloy (JIS ADC12, T6 process material)
processed hole diameter: 15 mm
cutting speed: 100 m/min
feed rate: 0.1 mm/tooth
coolant: wet condition The results are as shown in Table 9.

TABLE 9

| Sample No. | Existence of adhesion | Roughness of a finished surface Rmax ($\mu$m) |
| --- | --- | --- |
| 31 | without adhesion | 1.0 |
| 32 | without adhesion | 1.2 |
| 33 | without adhesion | 1.1 |
| 34 | slight adhesion | 2.1 |
| 35 | with adhesion | 9.3 |

When Samples No. 31 to 33 as sintered body tools of the present invention were used for processing, a surface layer having a weak bonding force with aluminum existed on the rake surface of the diamond sintered body tool, and therefore the aluminum alloy was not adhered. It was therefore made clear that superior roughness of the finished surface was obtained.

On the contrary, for the tool denoted by Sample No. 34 having a thick surface layer, the thick surface layer deteriorated the roughness of the tool rake surface as shown in Table 9, and therefore the aluminum alloy was slightly adhered. It was also found out in this sample that the roughness of the finished surface was slightly deteriorated although not remarkable.

However, for the sample denoted by Sample No. 35 not having any special surface layer, diamond on the rake surface and aluminum bonded each other strongly, the workpiece material was adhered, and the resulting deterioration of the roughness of the finished surface was recognized.

FIFTH EMBODIMENT

TABLE 10

| Sample No. | Time of immersion in an acid solution (min.) | Depth of a portion having an iron group metal content of at most 2.0% by weight (nm) | Thickness of a surface layer (nm) |
|---|---|---|---|
| 41 | 5 | 2.5 | 3 |
| 42 | 60 | 4000 | 3 |
| 43 | 180 | 6000 | 3 |
| 44 | without immersion | 0 | 3 |
| 45 | without immersion | 0 | 0 |

Table 10 shows various diamond sintered body tools prepared to examine the influences the depth of a portion from which an iron group metal was removed before forming a surface layer exerts on the adhesion resistance of a diamond sintered body tool in the diamond sintered body tool employing the iron group metal as a sintering catalyst. In short, for each of the tools in Table 10, a diamond sintered body having particles in the particle size range of at least 2 $\mu$m and at most 8 $\mu$m and employing cobalt as a main sintering catalyst were used as a tool base material. Before a surface layer was formed on the tool rake surface, the depth of a portion having an iron group metal content of at most 2.0% by weight (portion substantially not including the iron group metal) was variously set.

For each of the tools denoted by Samples No. 41 to 43, the tool was a desired reamer tool having two cutting edges, and the tool was immersed in a nitric acid solution at normal temperature to dissolve and extract cobalt from the rake surface and the flank face of the diamond sintered body tool.

The time for immersing the tools in the nitric acid solution was 5, 60 and 180 minutes, respectively. As a result, the depth of each of the portions having an iron group metal content of at most 2.0% by weight was as shown in Table 10. Thereafter, a similar method to that of the third embodiment was used to apply silicone grease on the rake surface and the flank face of each of the tools denoted by Samples No. 41 to 43, and thus surface layers including silicone and having a thickness of 3 nm were formed on the diamond sintered body surfaces.

For comparison, Samples No. 44 and 45 were manufactured. Sample No. 44 was a tool which was manufactured by a similar method to Samples No. 41 to 43 except that a surface layer was formed on the surface of a diamond sintered body without immersion in an acid solution. Sample No. 45 was a tool which was manufactured by a similar method to Samples No. 41 to 43 except that immersion in an acid solution and formation of a surface layer were not conducted. By performing the cutting processing using these tools, adhesion was evaluated.

workpiece: an aluminum alloy (JIS A6061, T6 process material)

processed hole diameter: 20 mm cutting speed: 80 m/min feed rate: 0.15 mm/tooth coolant: dry condition The results are as shown in Table 11.

TABLE 11

| Sample No. | Existence of adhesion | Roughness of a finished surface Rmax ($\mu$m) |
|---|---|---|
| 41 | without adhesion | 1.3 |
| 42 | without adhesion | 1.1 |
| 43 | without adhesion (in some case, the cutting edge is chipped) | 1.2 |
| 44 | slight adhesion | 1.6 |
| 45 | with adhesion | 13.9 |

As a result, when Samples No. 41 to 44 as sintered body tools of the present invention were used for processing, a surface layer having a weak bonding force with aluminum existed on the rake surface of a diamond sintered body tool, and therefore the aluminum alloy was not adhered. Therefore, it was made clear that superior roughness of the finished surface was obtained.

Above all, for Samples No. 41 and 42 in which the surface layer was formed after removing an iron group metal from the surface of the diamond sintered body tool, it was recognized that the workpiece material was not adhered even for long term cutting and remarkable effects were attained.

Similarly, for the tool denoted by Sample No. 43 in which the surface layer was formed after removing an iron group metal, it was observed that although adhesion was not caused, the thickness of a portion from which the iron group metal was removed was large and the strength of the cutting edge is low, and therefore the cutting edge was chipped in some cases.

For the tool denoted by Sample No. 45 in which surface treatment was not provided, substantial adhesion was recognized.

SIXTH EMBODIMENT

TABLE 12

| Sample No. | Concentration of hydrochloric acid (% by volume) | Iron group metal content (% by weight) | Existence of an SiC surface layer |
|---|---|---|---|
| 51 | 10 | 2.0 | with a surface layer |
| 52 | 30 | 1.1 | with a surface layer |
| 53 | 60 | 0.6 | with a surface layer |
| 54 | — | 5.0 | with a surface layer |
| 55 | — | 5.0 | without a surface layer |

Table 12 shows examples of various drill tools prepared to examine the influences that the iron group metal content of a previously acid-treated diamond sintered body exerts on adhesion.

In short, for each of the tools denoted by Samples No. 51 to 53 in Table 12, a diamond sintered body tool base material was first immersed in a hydrochloric acid solution to dissolve and extract an iron group metal. At this time, the content of the iron group metal in the diamond sintered body surface portion was adjusted to the content shown in Table 12 by changing the concentration of hydrochloric acid. Thereafter, each tool base material was brazed to a drill tool original material made of a cemented carbide to form the shape of a cutting edge. Thereafter, a similar method to that of the third embodiment was used to form a surface layer having a thickness of 3 nm and made of SiC on the tool rake surface and the tool flank face of the diamond sintered drill.

For comparison, the drill tool denoted by Sample No. 54 was prepared. Although Sample No. 54 was manufactured by a similar method to Samples No. 51 to 53, each diamond tool base material was not immersed in an acid solution to manufacture the tool, and then a surface layer having a thickness of 3 nm and made of SiC was formed on the tool rake surface and the tool flank face. For the drill tool denoted by Sample No. 55, the tool was formed without immersion in an acid solution and formation of a surface layer.

By performing the cutting processing using them under the following conditions, adhesion was evaluated.

workpiece: an aluminum alloy (JIS ADC12, T6 process material)
processed hole diameter: 5 mm
cutting speed: 50 m/min
feed rate: 0.08 mm/rev
coolant: wet condition The results are as shown in Table 13.

TABLE 13

| Sample No. | Existence of adhesion | Diameter of a processed hole (tolerance φ5 ± 0.006 mm) |
| --- | --- | --- |
| 51 | without adhesion | 5.002 |
| 52 | without adhesion | 4.998 |
| 53 | without adhesion | 5.001 |
| 54 | slight adhesion | 5.006 |
| 55 | significant adhesion | 5.044 |

It was made clear that when Samples No. 51 to 54 as sintered body tools of the present invention were used for processing, the aluminum alloy was not adhered and processed hole diameters within the tolerance were obtained. Especially for each of the tools denoted by Samples No. 51 to 53, it was recognized that even if the surface layer is worn during processing and the diamond sintered body surface is partially exposed, the effect of adhesion prevention is provided for a long period because an iron group metal which tends to be a starting point of adhesion does not exist on the exposed diamond sintered body surface.

It was recognized that similar effects are attained even when a diamond sintered body tool is manufactured by forming a surface layer on the surface of a diamond sintered body base material after the diamond sintered body tool base material is acid-treated, and thereafter performing brazing and provision of a cutting edge.

As described above, the diamond sintered body tool according to the present invention is useful for the field which requires strength and wear resistance such as a cutting edge tool, or a drilling edge tool.

What is claimed is:

1. A diamond sintered body tool (10) that is suitable and adapted to be used for cutting an aluminum alloy, comprising:
   a tool base material (12) including a diamond sintered body; and
   a surface layer (11) having a thickness of at least 0.1 nm and less than 1 μm and including at least one material selected from the group of silicon, a silicon oxide, a silicon carbide, a silicon nitride and a solid solution thereof, formed on a surface of said tool base material (12).

2. The diamond sintered body tool according to claim 1, wherein said surface layer consists essentially of said silicon oxide which is $SiO_2$.

3. The diamond sintered body tool according to claim 1, wherein said surface layer consists essentially of said silicon carbide which is SiC.

4. The diamond sintered body tool according to claim 1, wherein said surface layer consists essentially of said silicon nitride which is $Si_3N_4$.

5. The diamond sintered body tool according to claim 1, further comprising a tool original material and a braze layer interposed between and securing said tool base material to said tool original material.

6. The diamond sintered body tool according to claim 1, wherein said tool base material has a tool rake surface or a tool flank face, and said surface layer is formed on at least one of said tool rake surface and said tool flank face.

7. The diamond sintered body tool according to claim 1, wherein said thickness of said surface layer is at least 3 nm and not more than 200 nm.

8. The diamond sintered body tool according to claim 1, wherein said material is said silicon, and said surface layer essentially consists of said silicon.

9. The diamond sintered body tool according to claim 1, wherein said surface layer consists of a material including silicon and oxygen forming a siloxane bond.

10. A diamond sintered body tool (20) that is suitable and adapted to be used for cutting an aluminum alloy, comprising:
    a tool base material (22) including a diamond sintered body; and
    a surface layer (21) having a thickness of at least 0.1 nm and less than 1 μm and including at least one material selected from the group of silicon, a silicon oxide, a silicon carbide, a silicon nitride and a solid solution thereof formed on a surface of the tool base material (22), wherein
    said diamond sintered body of said tool base material (22) has an inner portion (22b) including a first content of an iron group metal, and a surface portion (22a) extending at least 2 nm and at most 5000 nm in depth from said surface of said diamond sintered body, surrounding said inner portion (22b), and including a second content of said iron group metal, said second content being lower than said first content.

11. The diamond sintered body tool according to claim 10, wherein said surface layer consists essentially of said silicon oxide which is $SiO_2$.

12. The diamond sintered body tool according to claim 10, wherein said surface layer consists essentially of said silicone carbide which is SiC.

13. The diamond sintered body tool according to claim 10, wherein said surface layer consists essentially of said silicon nitride which is $Si_3N_4$.

14. The diamond sintered body tool according to claim 10, wherein said second content is at most 2.0% by weight.

15. The diamond sintered body tool according to claim 10, further comprising a tool original material and a braze layer interposed between and securing said tool base material to said tool original material.

16. The diamond sintered body tool according to claim 10, wherein said tool base material has a tool rake surface or a tool flank face, and said surface layer is formed on at least one of said tool rake surface and said tool flank face.

17. The diamond sintered body tool according to claim 10, wherein said thickness of said surface layer is at least 3 nm and not more than 200 nm.

18. The diamond sintered body tool according to claim 10, wherein said material is said silicon, and said surface layer essentially consists of said silicon.

19. The diamond sintered body tool according to claim 10, wherein said surface layer consists of a material including silicon and oxygen forming a siloxane bond.

20. A diamond sintered body tool that is suitable and adapted to be used for cutting an aluminum alloy, comprising a diamond sintered body that comprises:
  an inner portion (32b) including a first content of an iron group metal; and
  a surface portion (32a) extending at least 2 nm and at most 5000 nm in depth from a surface of said diamond sintered body, surrounding said inner portion (32b), and including a second content of said iron group metal, said second content being lower than said first content.

21. The diamond sintered body tool according to claim 20, wherein said second content is at most 2.0% by weight.

22. The diamond sintered body tool according to claim 20, further comprising a tool original material and a braze layer interposed between and securing said diamond sintered body to said tool original material.

23. The diamond sintered body tool according to claim 20, wherein at least one of a tool rake surface and a tool flank face is formed on said surface portion.

24. A method of manufacturing a diamond sintered body tool that is suitable and adapted to be used for cutting an aluminum alloy, comprising the steps of:
  preparing a diamond sintered body;
  processing said diamond sintered body to form a diamond sintered body tool; and
  forming a surface layer having a thickness of at least 0.1 nm and less than 1 µm and including at least one material selected from the group of silicon, a silicon oxide, a silicon carbide, a silicon nitride and a solid solution thereof on a surface of said diamond sintered body tool.

25. A method of manufacturing a diamond sintered body tool that is suitable and adapted to be used for cutting an aluminum alloy, comprising the steps of:
  preparing a diamond sintered body including an iron group metal;
  processing said diamond sintered body to form a diamond sintered body tool; and
  surface treating said diamond sintered body tool by immersing said diamond sintered body tool in an acid solution to remove at least some of said iron group metal from a surface portion of said diamond sintered body extending at least 2 nm and at most 5000 nm in depth from a surface of said diamond sintered body and thereby to make a content of said iron group metal lower in said surface portion than in an inner portion of said diamond sintered body.

26. The method of manufacturing a diamond sintered body tool according to claim 25, wherein said acid solution includes at least one selected from the group of nitric acid, hydrochloric acid and hydrofluoric acid.

27. The method of manufacturing a diamond sintered body tool according to claim 25, wherein the content of said iron group metal in said surface portion is at most 2.0% by weight.

28. A method of manufacturing a diamond sintered body tool that is suitable and adapted to be used for cutting an aluminum alloy comprising the steps of:
  preparing a diamond sintered body including an iron group metal;
  processing said diamond sintered body to form a diamond sintered body tool;
  immersing said diamond sintered body tool in an acid solution to remove at least some of the iron group metal from a surface portion of said diamond sintered body extending at least 2 nm and at most 5000 nm in depth from a surface of said diamond sintered body and thereby to make a content of said iron group metal lower in said surface portion than in an inner portion of said diamond sintered body; and
  forming a surface layer having a thickness of at least 0.1 nm and less than 1 µm and including at least one material selected from the group of silicon, a silicon oxide, a silicon carbide, a silicon nitride and a solid solution thereof on said surface of the diamond sintered body tool.

29. The method of manufacturing a diamond sintered body tool according to claim 28, wherein said acid solution includes at least one selected from nitric acid, hydrochloric acid and hydrofluoric acid.

30. The method of manufacturing a diamond sintered body tool according to claim 28, wherein the content of said iron group metal in said surface portion is at most 2.0% by weight.

31. A method of manufacturing a diamond sintered body tool that is suitable and adapted to be used for cutting an aluminum alloy, comprising the steps of:
  preparing a diamond sintered body including an iron group metal;
  immersing said diamond sintered body in an acid solution to remove at least some of said iron group metal from a surface portion of said diamond sintered body extending at least 2 nm and at most 5000 nm in depth from a surface of said diamond sintered body and thereby to make a content of said iron group metal lower in said surface portion than in an inner portion of said diamond sintered body;
  after said immersing step, processing said diamond sintered body to obtain a diamond sintered body tool; and
  after said processing step, forming a surface layer having a thickness of at least 0.1 µm and less than 1 µm and including at least one material selected from the group of silicon, a silicon oxide, a silicon carbide, a silicon nitride and a solid solution thereof on said surface of said diamond sintered body.

32. The method of manufacturing a diamond sintered body tool according to claim 31, wherein said acid solution includes at least one selected from the group of nitric acid, hydrochloric acid and hydrofluoric acid.

33. The method of manufacturing a diamond sintered body tool according to claim 31, wherein the content of said iron group metal in said surface portion is at most 2.0% by weight.

34. A method of manufacturing a diamond sintered body tool that is suitable and adapted to be used for cutting an aluminum alloy, comprising the steps of:
  preparing a diamond sintered body including an iron group metal;
  immersing said diamond sintered body in an acid solution to remove at least some of said iron group metal from a surface portion of said diamond sintered body extending at least 2 nm and at most 5000 nm in depth from a surface of said diamond sintered body and thereby to make a content of said iron group metal lower in said surface portion than in an inner portion of said diamond sintered body;
  after said immersing step, forming a surface layer having a thickness of at least 0.1 nm and less than 1 µm and including at least one material selected from the group of silicon, a silicon oxide, a silicon carbide, a silicon nitride and a solid solution thereof on said surface of said diamond sintered body; and after said forming step, processing said diamond sintered body to obtain a diamond sintered body tool.

35. The method of manufacturing a diamond sintered body tool according to claim 34, wherein said acid solution includes at least one selected from the group of nitric acid, hydrochloric acid and hydrofluoric acid.

36. The method of manufacturing a diamond sintered body tool according to claim 34, wherein the content of said iron group metal in said surface portion is at most 2.0% by weight.

* * * * *

UNITED STATES PATENT AND TRADEMARK OFFICE
CERTIFICATE OF CORRECTION

PATENT NO.   : 6,528,159 B1
DATED        : March 4, 2003
INVENTOR(S)  : Kanada et al.

It is certified that error appears in the above-identified patent and that said Letters Patent is hereby corrected as shown below:

Column 2,
Line 35, after "0.1 nm.", replace "when" by -- When --;

Column 3,
Line 38, after "weight.", replace "when" by -- When --;

Column 16,
Lines 44 and 45, after "of said", replace "silicone" by -- silicon --.

Signed and Sealed this

Sixth Day of May, 2003

JAMES E. ROGAN
*Director of the United States Patent and Trademark Office*